US012499580B2

United States Patent
Echevarria Vallespi et al.

(10) Patent No.: US 12,499,580 B2
(45) Date of Patent: Dec. 16, 2025

(54) AUTOMATED COLORIMETRY TECHNIQUES SUPPORTING COLOR CLASSIFICATION

(71) Applicant: Adobe Inc., San Jose, CA (US)

(72) Inventors: Jose Ignacio Echevarria Vallespi, Belmont, CA (US); Michelle Mee-June Lee, New York, NY (US); Jacob Benjamin Hanson-regalado, Benicia, CA (US); Irgelkha Mejia, River Edge, NJ (US)

(73) Assignee: Adobe Inc., San Jose, CA (US)

( * ) Notice: Subject to any disclaimer, the term of this patent is extended or adjusted under 35 U.S.C. 154(b) by 418 days.

(21) Appl. No.: 18/303,918

(22) Filed: Apr. 20, 2023

(65) Prior Publication Data

US 2024/0354994 A1    Oct. 24, 2024

(51) Int. Cl.
*G06T 7/90* (2017.01)
*G06Q 30/0601* (2023.01)
*G06T 7/10* (2017.01)

(52) U.S. Cl.
CPC .......... *G06T 7/90* (2017.01); *G06Q 30/0631* (2013.01); *G06Q 30/0643* (2013.01); *G06T 7/10* (2017.01); G06T 2200/24 (2013.01); G06T 2207/10024 (2013.01); G06T 2207/20021 (2013.01); G06T 2207/30196 (2013.01)

(58) Field of Classification Search
CPC ......... G06T 7/90; G06T 7/10; G06Q 30/0631; G06Q 30/0643; G06Q 2207/30196
USPC ........................................ 382/164
See application file for complete search history.

(56) References Cited

U.S. PATENT DOCUMENTS

| 6,236,460 B1 | 5/2001 | Johnson et al. |
| 11,010,894 B1 | 5/2021 | Shenk et al. |
| 12,243,288 B2 | 3/2025 | Saad |

(Continued)

FOREIGN PATENT DOCUMENTS

| KR | 20220123851 A | * | 9/2022 | ......... G06Q 30/0641 |
| WO | WO-2008108760 A1 | * | 9/2008 | ........... A45D 44/005 |
| WO | WO-2010093503 A2 | * | 8/2010 | ............. A61B 5/445 |

OTHER PUBLICATIONS

U.S. Appl. No. 17/704,030, "Non-Final Office Action", U.S. Appl. No. 17/704,030, Sep. 17, 2024, 11 pages.

(Continued)

*Primary Examiner* — Jamares Q Washington
(74) *Attorney, Agent, or Firm* — FIG. 1 Patents

(57) ABSTRACT

In implementation of automated colorimetry techniques supporting color classification, a computing device implements a color coordination system to receive a digital image depicting a person. The color coordination system then identifies a color classification for the person based on the digital image, the color classification associated with a color recommendation that is represented as a color distribution. The color coordination system identifies an item associated with a color of the color recommendation by identifying a point of the color distribution associated with a color of the item that is within a threshold distance from a point associated with the color of the color recommendation. Then, the color coordination system displays a recommendation that includes the item in a user interface.

20 Claims, 13 Drawing Sheets

(8 of 13 Drawing Sheet(s) Filed in Color)

(56) References Cited

U.S. PATENT DOCUMENTS

| | | | | |
|---|---|---|---|---|
| 2013/0300761 A1* | 11/2013 | Ahmed | .................... | G09G 5/02 |
| | | | | 345/595 |
| 2015/0186965 A1 | 7/2015 | Paul | | |
| 2015/0326842 A1* | 11/2015 | Huai | .................... | H04N 23/611 |
| | | | | 348/223.1 |
| 2015/0339757 A1 | 11/2015 | Aarabi | | |
| 2018/0374140 A1* | 12/2018 | Stucki | .................. | G06V 40/168 |
| 2019/0377969 A1* | 12/2019 | Kuo | ....................... | G06V 40/16 |
| 2023/0074782 A1 | 3/2023 | Tendulkar et al. | | |
| 2023/0306714 A1 | 9/2023 | Saad et al. | | |

OTHER PUBLICATIONS

"A Guide to Understanding Color", X-rite Pantone [retrieved May 20, 2023]. Retrieved from the Internet <https://www.xrite.com/-/media/xrite/files/whitepaper_pdfs/l10-001_a_guide_to_understanding_color_communication/l10-001_understand_color_en.pdf>., 40 Pages.

"MAC Cosmetics Virtual Try-On", Make-Up Art Cosmetics [retrieved May 20, 2023]. Retrieved from the Internet <https://www.maccosmetics.com/virtual-try-on>., 109 Pages.

"Say hej to IKEA Place", IKEA [retrieved May 20, 2023]. Retrieved from the Internet <https://www.ikea.com/au/en/customer-service/mobile-apps/say-hej-to-ikea-place-pub1f8af050>., 3 Pages.

Saad, Michele, et al., "US Application as Filed", U.S. Appl. No. 17/704,030, filed Mar. 25, 2022, 31 pages.

"Notice of Allowance", U.S. Appl. No. 17/704,030, Jan. 8, 2025, 8 pages.

* cited by examiner

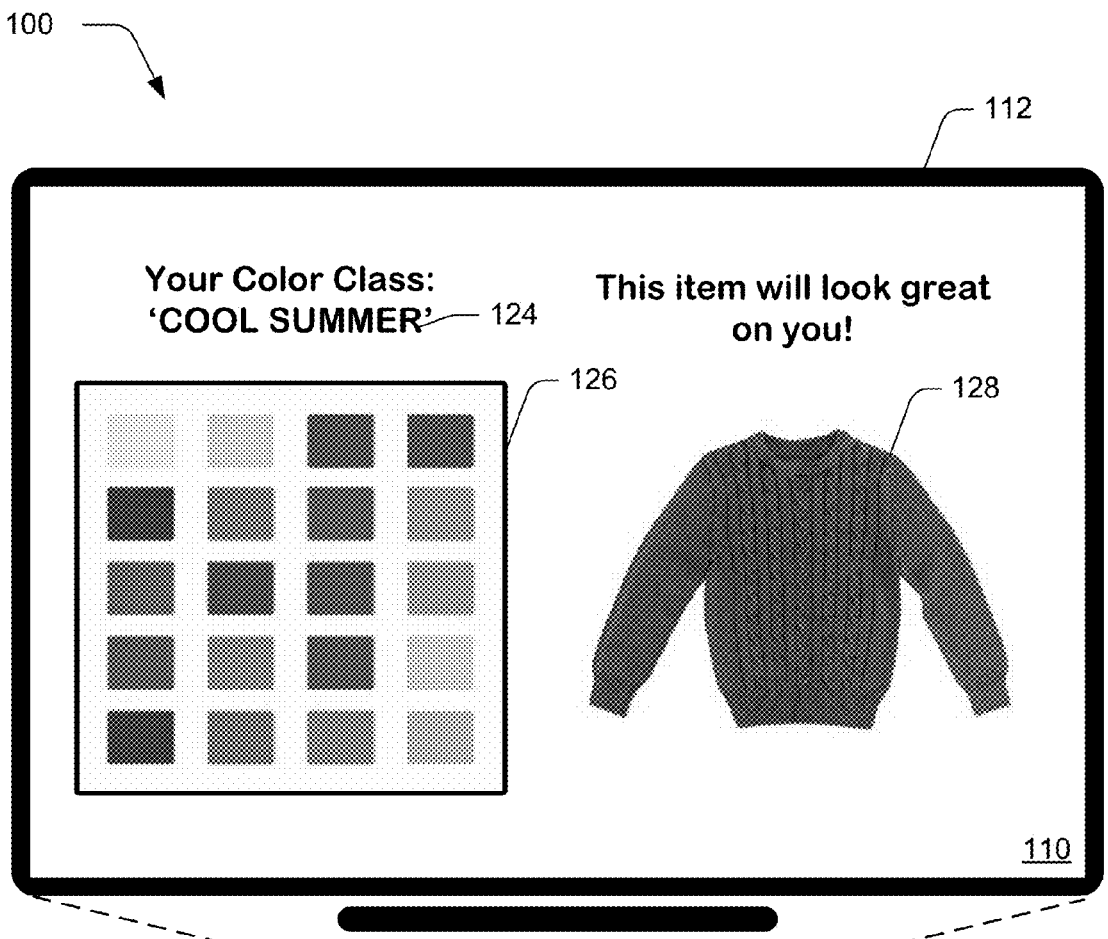
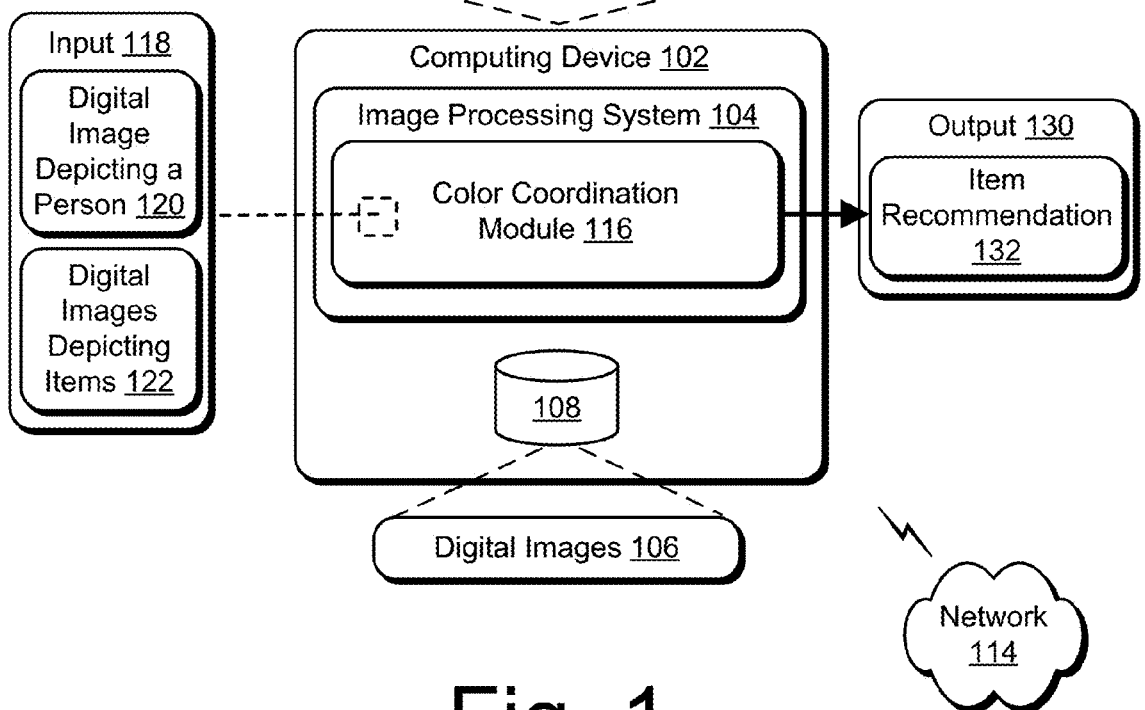
Fig. 1

Color Classification Module 202

| Color Classification | Skin Undertone | Hair Brightness | Color Saturation | Color Contrast |
|---|---|---|---|---|
| Deep Winter | Cool | Low | High | High |
| Cool Winter | Cool | Medium | High | High |
| Clear Winter | Cool | High | High | High |
| Clear Spring | Warm | Medium | High | High |
| Warm Spring | Warm | Medium | High | Low |
| Light Spring | Warm | High | Medium | Low |
| Light Summer | Cool | High | Medium | Medium |
| Cool Summer | Cool | Medium | Low | Medium |
| Soft Summer | Cool | Medium | Low | Low |
| Soft Autumn | Warm | High | Low | Low |
| Warm Autumn | Warm | Medium | Medium | Low |
| Deep Autumn | Warm | Low | High | Low |

Fig. 5

AUTOMATED COLORIMETRY TECHNIQUES SUPPORTING COLOR CLASSIFICATION

BACKGROUND

Colorimetry is a science of quantifying and physically describing human color perception. Existing colorimetry techniques involve manual selection of colors that compliment other colors. For example, colorimetry techniques are used to manually classify a person based on facial features, including hair color, skin, tone, or eye color, and then to identify clothing items featuring colors that complement the person's facial features. However, these manual techniques are time consuming and are prone to visual inaccuracies due to human perceptual bias.

SUMMARY

Automated colorimetry techniques supporting color classifications are described. In an example, a color coordination system receives a digital image depicting a person. The color coordination system then identifies a color classification for the person based on features of the person, and the color classification is associated with a color recommendation that is represented as a color distribution. For example, the color distribution is a 3D histogram. In some examples, the color coordination system identifies the features of the person by segmenting a portion of the digital image depicting facial skin, hair, or eyes from the digital image and calculates a skin undertone, a hair brightness, a color saturation, and a color contrast based on the portion of the digital image depicting the facial skin, the hair, or the eyes.

The color coordination system then identifies an item associated with a color of the color recommendation by identifying a point of the color distribution associated with a color of the item that is within a threshold distance from a point associated with the color of the color recommendation. For example, the color coordination system multiplies a value assigned to the point of the color distribution associated with the color of the item by a value assigned to the point associated with the color of the color recommendation to determine whether a product of the multiplying meets a threshold value. The color coordination system then displays a recommendation that includes the item in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 1 is an illustration of a digital medium environment in an example implementation that is operable to employ automated colorimetry techniques supporting color classification as described herein.

FIG. 5 depicts an example of predetermined criteria for different color classifications.

DETAILED DESCRIPTION

Overview

Figure 2:
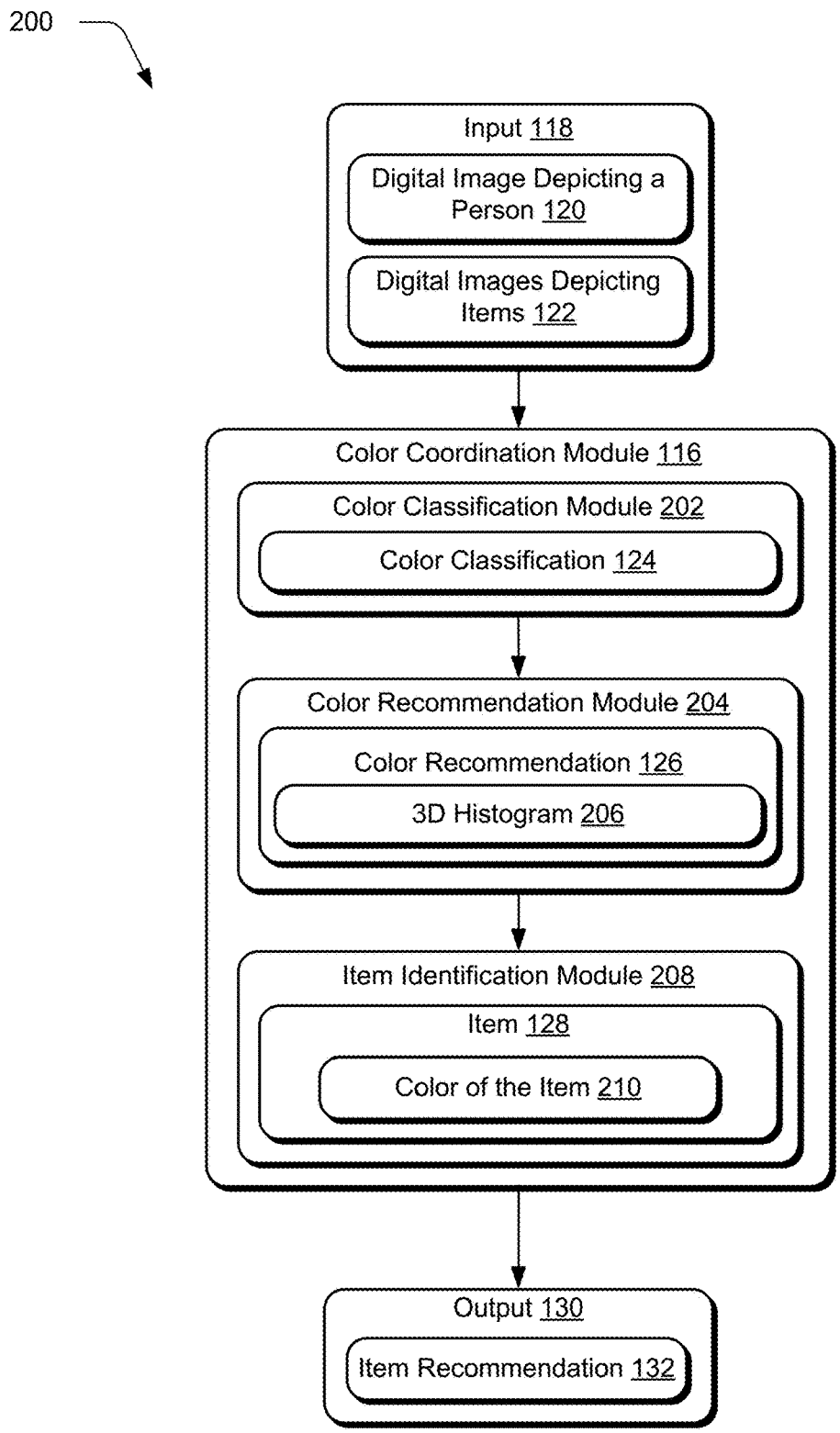
FIG. 2 depicts a system in an example implementation showing operation of a color coordination module for automated colorimetry techniques supporting color classification.

Colorimetry is a science of quantifying and physically describing human color perception. Existing colorimetry techniques attempt to determine what colors look good on a person by using manual selection of colors that compliment other colors. For example, a person hires an expert to use colorimetry techniques to manually classify the person by comparing their facial features, including hair color, skin, tone, or eye color, to reference examples. Based on the classification, the expert identifies recommended colors that complement the person's facial features, which is then used as a basis for future interactions, e.g., to obtain items based on the recommended colors. However, these manual techniques are time consuming and are prone to visual inaccuracies due to human perceptual bias. For example, experts are limited to classifying a person based on existing reference examples and are unable to classify a person with facial features that are different from an existing reference example. Additionally, the person is unable to determine whether a color of an item is a close match to one of the colors identified to complement the person's facial features by merely looking at the color.

Automated colorimetry techniques supporting color classification are described that overcome these limitations. A color coordination system begins in this example by receiving a digital image of a person. For example, a user of an online shopping website is prompted to capture and upload a self-portrait digital image using a camera.

After receiving the digital image of the person, the color coordination system automatically identifies a color classification for the person based on the person's facial features depicted in the digital image, including facial skin, hair, and eyes. The color coordination system does this by segmenting the person's features from the rest of the digital image and performing white balancing on the facial features to correct imbalances in lighting. The color coordination system then calculates a level of skin undertone, a level of hair brightness, a level of color saturation, and a level of color contrast for the person based on the facial features. Different levels correspond to different predetermined color classifications. For example, a "warm" skin undertone, a "medium" hair brightness, a "high" color saturation, and a "low" color contrast correspond to a specific color classification called "Warm Spring," which is then assigned to the person.

Color classifications correspond to color recommendations, which are collections of predetermined colors that produce an aesthetically pleasing effect when worn as clothing items by a person with the corresponding color classification. For example, a "Warm Spring" color classification corresponds to a color recommendation including brown, yellow, and orange.

The color recommendation is represented as a color distribution, which stores the colors of the color recommendation. For example, the color distribution is a 3D histogram automatically generated by the color coordination system that plots perceptual variations of hue, chroma, and lightness for color in a CIE Lab color space. Bins of the 3D histogram that include a color are assigned a color recommendation value of 1, and empty bins that do not include a color are assigned a color recommendation value ranging from 1 to 0 based on an empty bin's distance to a bin containing a color.

The color coordination system also receives a series of digital images of items. For example, the items are different articles of clothing in inventory that are potential recommendations for the person. The representation system first determines which colors are featured on each item. In order to account for color variations on each item due to shadows and folds in fabric, different colors featured on the item are captured on an item color distribution. In this example, the item color distribution is an item color 3D histogram that includes bins corresponding to bins of the 3D histogram. Bins of the item color 3D histogram containing colors are assigned an item color value ranging from 1 to 0 based on how prevalent the color is on the item, with values closest to 1 indicating a more prevalent color than values closer to 0. This provides a metric for determining a "true" color of an item and is calculated for each item in the series of digital images of items.

To identify an item that features a color similar to a color of the color recommendation, the color coordination system multiplies each item color value by a color recommendation value assigned to a corresponding bin on the 3D histogram to produce a match value. A high match value indicates a close match between a "true" color of an item and a color of the color recommendation. To determine which item to recommend to the person, the color coordination system identifies an item with the highest match value or recommends a group of items that have match values above a predetermined threshold. In an example, the color coordination system then displays an indication recommending the item in the user interface.

Accordingly, the automated colorimetry techniques supporting color classification as described above overcomes the disadvantages of conventional colorimetry techniques that are limited to manually classifying a person based on reference examples to recommend a series of colors. For example, automatically identifying a color classification avoids conventional limitations of use of existing reference examples, allowing more variations of facial features to be classified. Automatically plotting a color recommendation and colors of items to a 3D histogram and identifying an item by evaluating a similarity between colors of the color recommendation and colors of the items based on the 3D histogram eliminates manual classifications. This results in a fast and accurate item identification that reduces the effects of human error and perceptual bias. Further discussion of these and other examples and advantages are included in the following sections and shown using corresponding figures.

Term Examples

As used herein, the term "color classification" refers to a predetermined visual classification for a person based on features of the person's appearance, including facial skin, hair, or eyes. For example, a color classification is determined based on a level of skin undertone, a level of hair brightness, a level of color saturation, or a level of color contrast that fall within a predetermined range corresponding to a specific color classification of several possible color classifications.

As used herein, the term "color recommendation" pertains to a collection of predetermined colors corresponding to a specific color classification. An aesthetically pleasing effect occurs when a person wears clothing items containing colors of a color recommendation associated with the corresponding color classification.

As used herein, the term "3D histogram" refers to a three-dimensional representation of numerical data from a digital image used to record a color distribution within the digital image. A 3D histogram includes bins arranged in a 3D grid. A bin contains pixels that fall within a range associated with the bin, including intervals of data. For example, pixels are sorted by color and grouped into different bins in the 3D histogram. In this example, X, Y, and Z axes of the 3D histogram plot perceptual variations of hue, chroma, and lightness for color in a CIE Lab color space.

As used herein, the term "skin undertone" refers to a color that is deep below a skin surface and is independent of skin pigmentation. A level of skin undertone is determined by calculating an aggregate intensity of green/yellow versus red/blue hues in facial skin. Skin undertone is described as cool or warm and is scored as a percentage of red/blue.

As used herein, the term "hair brightness" refers to a measure of lightness or darkness of hair. A level of hair brightness is determined by calculating an aggregate brightness of a person's hair. Hair brightness is described as low, medium, or high and is scored on a scale of 0 to 1.

As used herein, the term "color saturation" refers to an intensity of a color. A level of color saturation is determined by calculating an aggregate saturation of hues present in facial skin, hair, or eyes. Color saturation is described as low, medium, or high and is scored on a scale of 0 to 1.

As used herein, the term "color contrast" refers to a difference between different colors. A level of color contrast is determined by calculating a deviation of a person's facial skin, hair, or eye brightness from the person's average brightness. Color contrast is described as low, medium, or high and is scored on a scale of 0 to 1.

As used herein, the term "white balancing" pertains to a process of removing unnatural color casts from an image so that objects that appear white in real life are rendered as white in a digital image. White balancing takes into account a color temperature of a light source, which refers to a relative warmth or coolness of white light.

In the following discussion, an example environment is described that employs the techniques described herein.

Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ automated colorimetry techniques supporting color classification as described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 13.

The computing device 102 also includes an image processing system 104. The image processing system 104 is implemented at least partially in hardware of the computing device 102 to process and represent digital images 106, which is illustrated as maintained in storage 108 of the computing device 102. Such processing includes creation of the digital images 106, representation of the digital images 106, modification of the digital images 106, and rendering of the digital images 106 for display in a user interface 110 for output, e.g., by a display device 112. Although illustrated as implemented locally at the computing device 102, functionality of the image processing system 104 is also configurable entirely or partially via functionality available via the network 114, such as part of a web service or "in the cloud."

The computing device 102 also includes a color coordination module 116 which is illustrated as incorporated by the image processing system 104 to process the digital images 106. In some examples, the color coordination module 116 is separate from the image processing system 104 such as in an example in which the color coordination module 116 is available via the network 114.

The color coordination module 116 is configured to identify an item based on a color classification by first receiving an input 118 that includes a digital image depicting a person 120 and digital images depicting items 122. For example, the digital image depicting a person 120 is a digital image captured by an image capture device that depicts the person and is displayed in the user interface 110. The digital image of the person depicts the person's facial skin, hair, and eyes. In some examples, the person is a user of an application that identifies items based on a color classification. The digital images of the items 122 depict items listed for sale at an online retail store or at a physical retail store. In some examples, each of the digital images of the items 122 depict one item.

The color coordination module 116 then assigns a color classification 124 based on features of the person depicted the digital image depicting the person 120. To do this, the color coordination module 116 identifies portions of the digital image depicting the person 120 that depict facial skin and determines a level of skin undertone for the person. The color coordination module 116 also identifies portions of the digital image depicting the person 120 that depict hair and determines a level of hair brightness for the person. The color coordination module 116 also determines a level of color saturation and a level of color contrast for the person. Based on the level of skin undertone, the level of hair brightness, the level of color saturation, and the level of color contrast, the color coordination module 116 determines the color classification 124 that describes the person.

The color classification 124 corresponds to a color recommendation 126, which is a set of recommended colors that complement the color classification 124 and look aesthetically pleasing featured in clothing items worn by a person with the color classification 124. The color coordination module 116 automatically generates a color distribution based on colors of the color recommendation 126. For example, the color distribution is a 3D histogram. Points on the 3D histogram are assigned color recommendation values based on a Euclidean distance from a point to a closest point representing a color. For example, points on the 3D histogram that represent a color of the color recommendation 126 are assigned a value of 1, and points on the 3D histogram that are farthest from a color of the color recommendation 126 are assigned decreasing values approaching 0.

The color coordination module 116 also extracts item colors from each item depicted in digital images of the items 122 and stores the item colors on the 3D histogram. In some examples, each item includes multiple item colors. To compensate for wrinkles and shadows in the digital images, each item color is assigned an item color value based on a prominence in the image of the item. For example, a very prevalent color in an image of an item is assigned a value near 1, which is considered a "true" color of the item. The least prevalent colors of the image of the item are assigned decreasing values near 0.

The color coordination module 116 then identifies an item 128 that is associated with a color of the color recommendation 126 by multiplying each item color value by a color recommendation value assigned to a corresponding point on the 3D histogram to produce a match value. The match value provides a measure of how "true" the color of the item is and how similar the color of the item is to a color of the color recommendation. In some examples, the color coordination module 116 ranks match values in order of magnitude to determine an item 128 to recommend. In other examples, the color coordination module 116 selects an item 128 with a match value that is within a threshold range based on predetermined criteria. In some examples, the color coordination module 116 then generates an output 130 including an item recommendation 132 that includes the item 128 displayed in the user interface 110.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Automated Colorimetry Techniques Supporting Color Classification

FIG. 2 depicts a system 200 in an example implementation showing operation of the color coordination module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-13.

To begin in this example, the color coordination module 116 receives an input 118 including a digital image depicting a person 120. The input 118 also includes digital images depicting items 122.

The color coordination module 116 also includes a color classification module 202. For instance, the color classification module 202 assigns a color classification 124 to the person based on features of the person, including facial skin color and hair color. To determine a color classification 124, the color classification module 202 detects the features of the person and determines a level of skin undertone, a level of hair brightness, a level of color saturation, and a level of color contrast of the person depicted in the digital image depicting the person 120. Based on the level of skin undertone, the level of hair brightness, the level of color saturation, and the level of color contrast of the person, the color classification module 202 determines a color classification 124 based on a predetermined color classification criteria. For example, the predetermined color classification criteria stipulate that a person with a person with a cool skin undertone, a low hair brightness, a high color saturation, and a high color contrast is assigned a color classification labeled "Deep Winter." Different color classifications are further discussed with respect to FIG. 5.

The color coordination module 116 also includes a color recommendation module 204. For instance, the color recommendation module 204 assigns a color recommendation 126 to the person based on the color classification 124. The color recommendation 126 is a set of predetermined colors that complement the level of skin undertone, the level of hair brightness, the level of color saturation, and the level of color contrast of a particular color classification. For example, a color recommendation 126 for the color classification 124 of "Deep Winter" include bold dark colors. The color recommendation module 204 also generates a 3D histogram 206 by locating the colors of the color recommendation 126 in a 3D space. The color recommendation module 204 then assigns color recommendation values ranging from 0 to 1 to points of the 3D histogram based on a Euclidean distance from a point to a closest point representing a color. For example, points on the 3D histogram that represent a color of the color recommendation 126 are assigned a value of 1, and points on the 3D histogram that are farthest from a color of the color recommendation 126 are assigned decreasing values approaching 0.

The color coordination module 116 also includes an item identification module 208. For instance, the item identification module 208 identifies an item 128 for recommendation to be worn by the person by determining that a color of the item 210 matches a color of the color recommendation 126. To do this, item identification module 208 extracts item colors from each item depicted in digital images depicting the items 122 and locates the item colors on the 3D histogram. In other examples, the item identification module 208 locates item colors associated with an individual item on an item color 3D histogram that includes bins that correspond to bins of the 3D histogram 206. The item identification module 208 also assigns an item color value ranging from 0 to 1 to each item color. For example, a very prevalent color in an image of an item is assigned a value near 1, which is considered an accurate color of the item. The least prevalent colors of the image of the item are assigned decreasing values near 0.

The item identification module 208 then identifies an item 128 with a color that matches a color of the color recommendation 126 by multiplying each item color value by a color recommendation value assigned to a corresponding point on the 3D histogram to produce a match value. The match value provides a measure of how accurate the color of the item is and how similar the color of the item is to a color of the color recommendation. A match value is calculated for each item in the digital images depicting items to determine the item 128 to recommend. In some examples, the color coordination module 116 ranks match values in order of magnitude to determine an item 128 to recommend.

In some examples, the output 130 of the color coordination module 116 includes an item recommendation 132. For example, a communication displayed in the user interface 110 indicates that the item 128 is recommended to a user, who is the person depicted in the digital image depicting the person 120, to buy because the item 128 has a high likelihood of looking aesthetically pleasing when worn by the user based on the color classification 124 of the person and the color of the item 210.

FIGS. 3-10 depict stages of automated colorimetry techniques supporting color classification. In some examples, the stages depicted in these figures are performed in a different order than described below.

Figure 3:
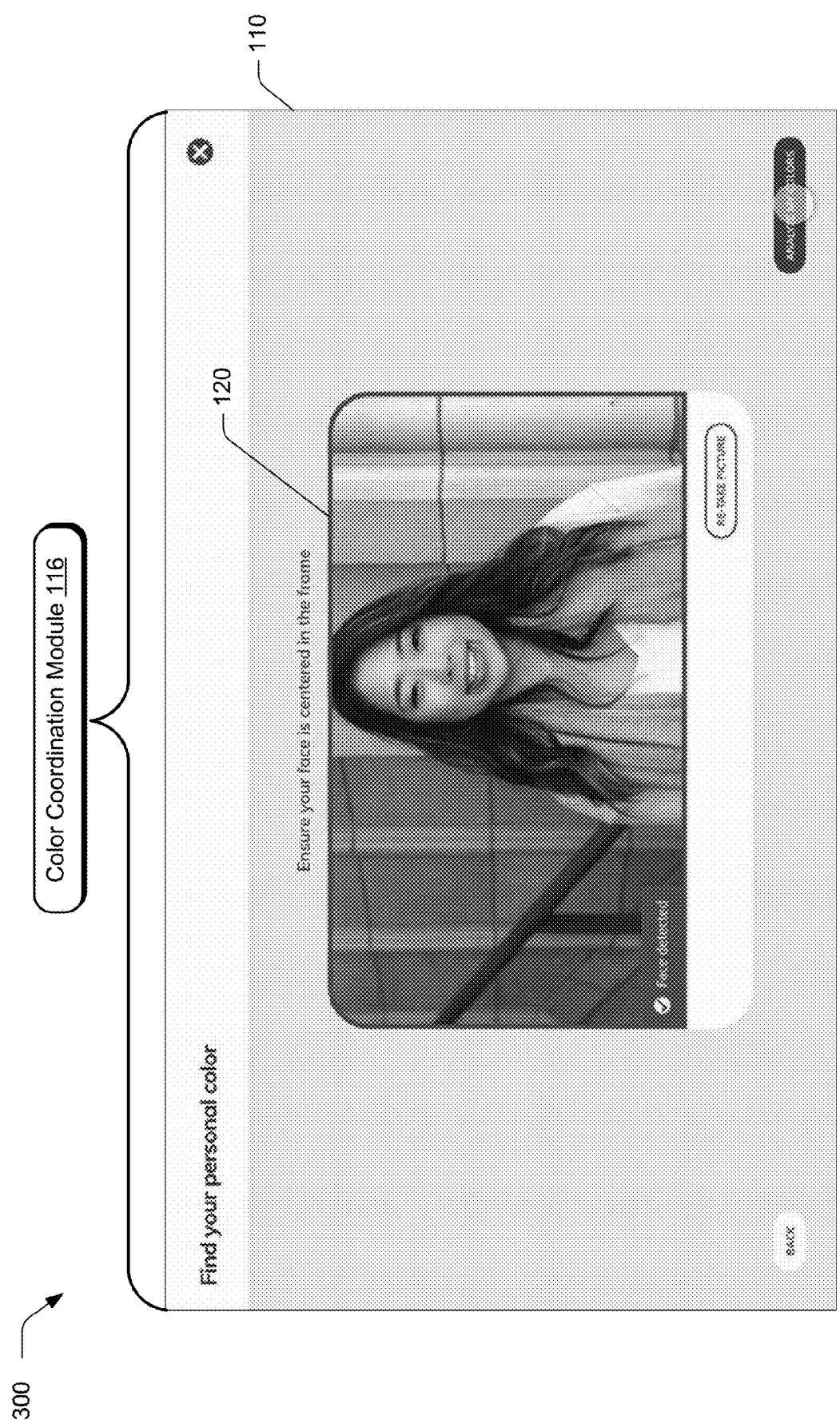
FIG. 3 depicts an example of receiving a digital image depicting a person.

FIG. 3 depicts an example 300 of receiving a digital image depicting a person 120. As illustrated, the color coordination module 116 receives an input 118 that includes a digital image depicting a person 120.

Consider an example in which a user visits a website of an online clothing retailer using a computing device 102. The user is shopping for clothing to purchase but is unsure which clothing colors look best based on the user's appearance. In response to the user visiting the website, the color coordination module 116 displays a prompt in the user interface 110 for the user to upload a digital image depicting the user. In this example, the color coordination module 116 uses an image capture device associated with the computing device 102 to allow the user to capture an image (i.e. a "selfie") of the user. The color coordination module 116 displays instructions in the user interface 110 to assist the user in performing this task, including "take picture," "ensure your face is centered in the frame," and "re-take picture." In some examples, the color coordination module 116 detects a face displayed in the user interface 110 in real time as the face is captured by the image capture device and communicates to the user that the face is inside a visible frame. Alternatively, the color coordination module 116 prompts the user to upload a digital image.

In this example, the digital image depicting the person 120 is input by the user. In some examples, the user is the person depicted in the digital image depicting the person 120. In other examples, the person depicted in the digital image depicting the person 120 is not the user. For instance, the user is shopping for a spouse and uploads a digital image depicting the user's spouse.

Figure 4:
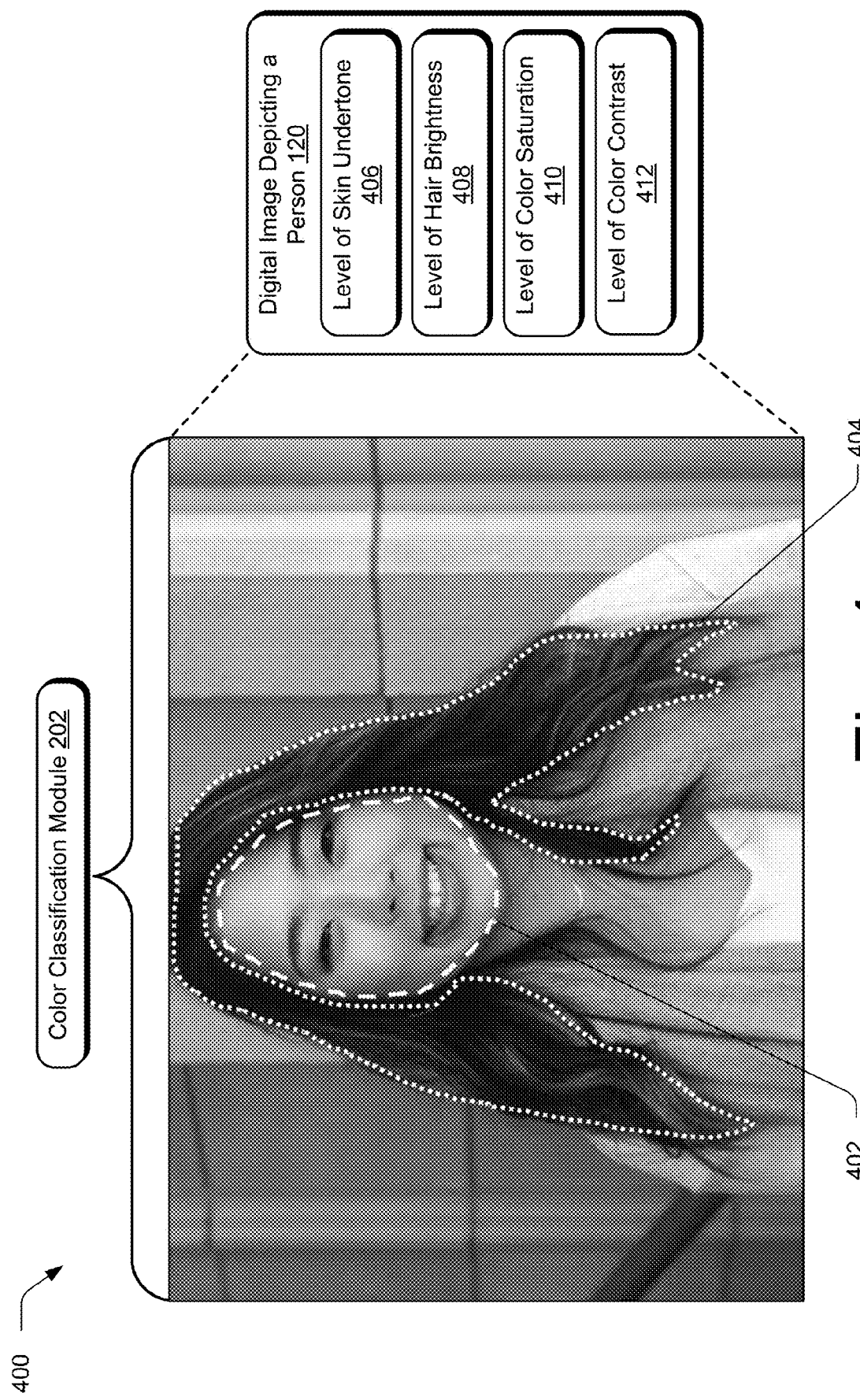
FIG. 4 depicts an example of determining a color classification.

FIG. 4 depicts an example 400 of determining a color classification 124. FIG. 4 is a continuation of the example described in FIG. 3. After the color coordination module 116 receives the digital image depicting the person 120, the color classification module 202 determines a color classification 124 for the person.

For example, the color classification module 202 segments a portion depicting facial skin 402 and a portion depicting hair 404 from the digital image depicting the person 120. In some examples, the color classification module 202 also segments white portions of the digital image depicting the person 120, including a portion depicting teeth or a portion depicting an eye to perform white balancing on the digital image depicting the person 120.

Based on the portion depicting facial skin 402, the color classification module 202 determines a level of skin undertone 406 for the person. For example, the level of skin undertone 406 is determined by calculating an aggregate intensity of red or green hues in facial skin.

Based on the portion depicting hair 404, the color classification module 202 determines a level of hair brightness 408 for the person. For example, the level of hair brightness 408 is determined by calculating an aggregate brightness of the person's hair.

The color classification module 202 also determines a level of color saturation 410 and a level of color contrast 412 for the person. For example, the level of color saturation 410, or chroma, is determined by calculating an aggregate saturation of hues present in facial skin, hair, or eyes. The level of color contrast 412 is determined by calculating a variation within facial skin, hair, or eye brightness.

Based on the level of skin undertone 406, the level of hair brightness 408, the level of color saturation 410, and the level of color contrast 412, the color classification module 202 determines the color classification 124 that describes the person. For example, the level of skin undertone 406, the level of hair brightness 408, the level of color saturation 410, and the level of color contrast 412 are described as values within a predetermined range. Based on the predetermined range, the color classification module 202 determines a color classification 124 based on predetermined criteria.

In this example, the color classification module 202 determines that the level of skin undertone 406 has a value of 75%, the level of hair brightness 408 has a value of 0.15, the level of color saturation 410 has a value of 0.2, and the level of color contrast 412 has a value of 0.5 based on a predetermined color classification criteria. For example, the predetermined color classification criteria stipulate that a "cool" level of skin undertone 406 has a value range of 66%-100%, a "low" level of hair brightness 408 has a value of range of 0.1-0.25, a "low" level of color saturation 410 has a value range of 0.1-0.3, and a "medium" level of color contrast 412 has a value range of 0.3-0.6. Additionally, based on the predetermined criteria, the color classification module 202 determines that a person with a "cool" level of skin undertone, a "low" level of hair brightness, "low" level of color saturation, and a "medium" level of color contrast has a color classification 124 of "cool summer." In some examples, the color classification 124 is saved to a user profile associated with the person.

FIG. 5 depicts an example 500 of predetermined criteria 502 for different color classifications. For example, the chart in FIG. 5 depicts skin undertone levels, hair brightness levels, color saturation levels, and color contrast levels that correspond to different color classifications. In this example, color classifications are assigned the names Deep Winter, Cool Winter, Clear Winter, Clear Spring, Warm Spring, Light Spring, Light Summer, Cool Summer, Soft Summer, Soft Autumn, Warm Autumn, and Deep Autumn. In other examples, color classifications are assigned using an alternative naming or numbering scheme.

In some examples, a color classification 124 is a blend of different color classifications. For example, a color classification 124 assigned to a person is a 75% Clear Spring and a 25% Warm Spring. The percentages indicate how strongly the color classification 124 correlates to a person based on the person's facial features.

Figure 6:
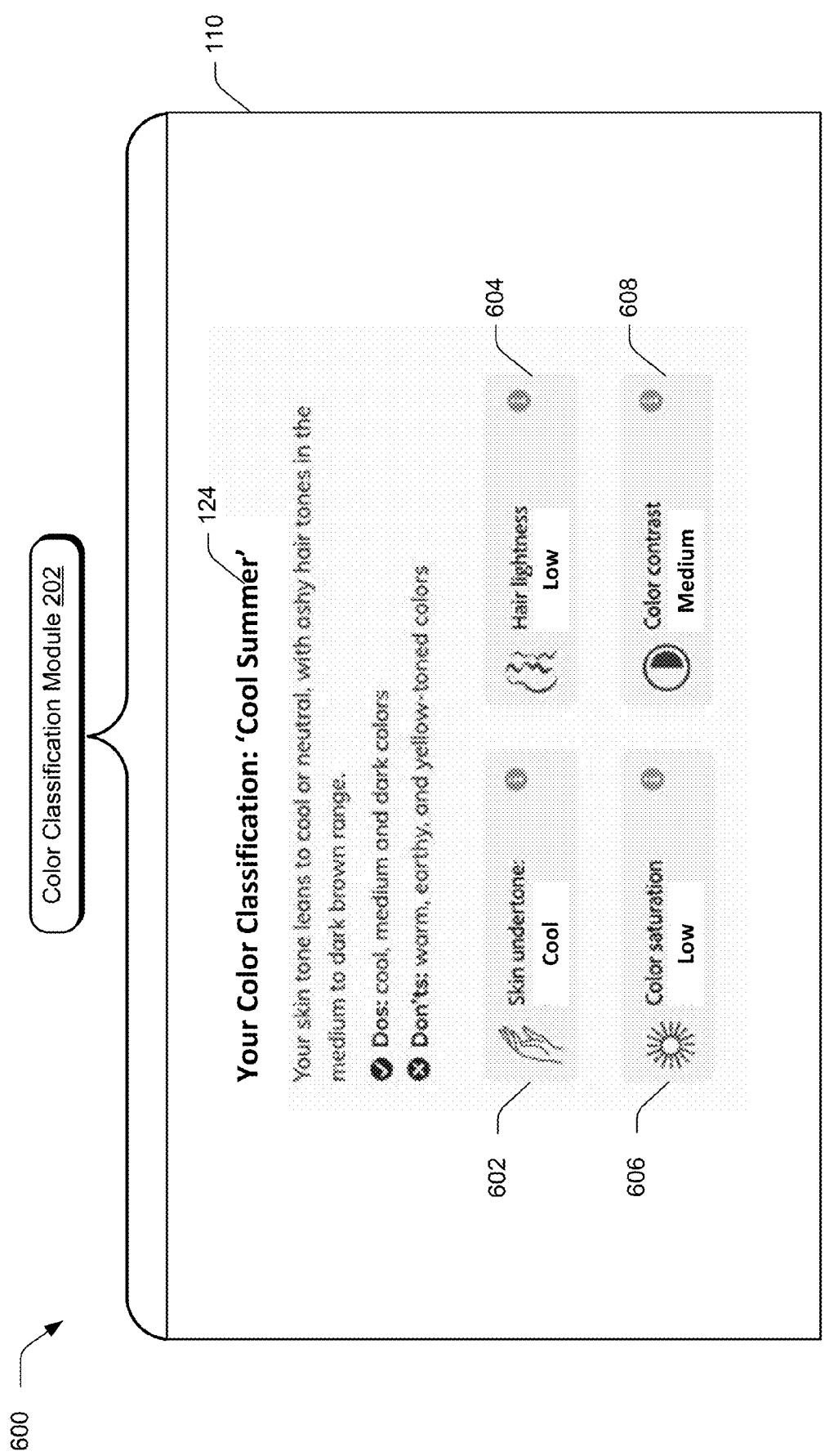
FIG. 6 depicts an example of assigning a color classification to the person.

FIG. 6 depicts an example 600 of assigning a color classification 124 to the person. FIG. 6 is a continuation of the example described in FIG. 4. After the color classification module 202 determines the color classification 124 that describes the person, the color classification module 202 assigns the color classification 124 to the person and communicates the color classification 124 via the user interface 110.

In this example, the color classification module 202 determines the person has a color classification 124 of "Cool Summer." The color classification module 202 assigns this color classification 124 to the person depicted in the digital image depicting the person 120. In this example, the color classification module 202 communicates this assignment to the user by generating a communication for display in the user interface 110 that says "Your Color Classification: 'Cool Summer'." The color classification module 202 also generates communications for display in the user interface 110 that indicate Cool Skin Undertone 602, Low Hair Brightness 604, Low Color Saturation 606, and Medium Color Contrast 608. In this example, the color classification module 202 also generates a communication for display in the user interface 110 that explains the meaning of a "Cool Summer" color classification that says "Your skin tone leans to cool or neutral, with ashy hair tones in the medium to dark brown range," tips for colors to wear that include "cool, medium, and dark brown colors" and tips for colors to avoid wearing that include "warm, earthy, and yellow-tones colors."

Figure 7:
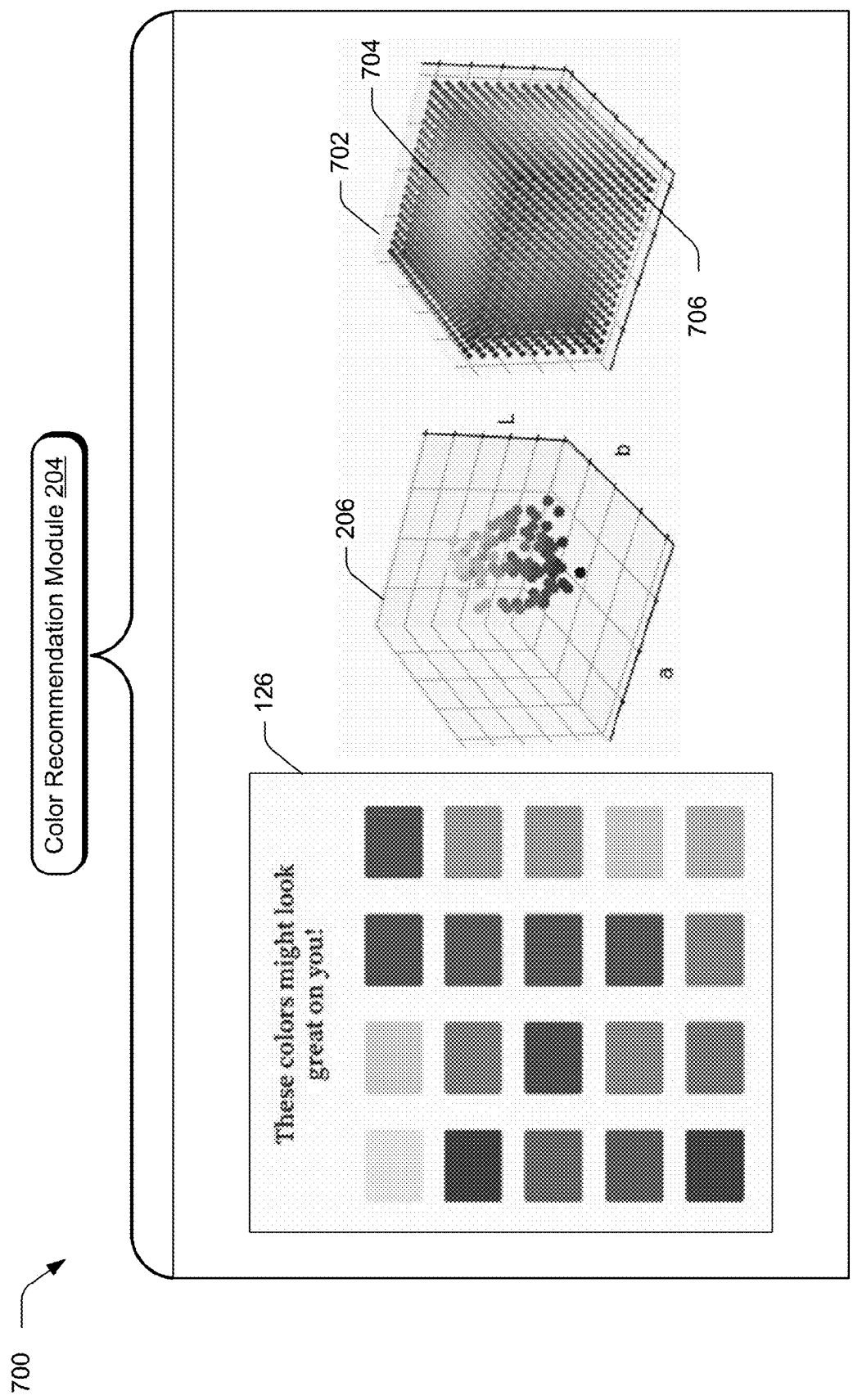
FIG. 7 depicts an example of a color recommendation represented as a color distribution.

FIG. 7 depicts an example 700 of a color recommendation represented as a color distribution. FIG. 7 is a continuation of the example described in FIG. 6. After the color recommendation module 204 assigns the color classification 124 to the person, the color recommendation module 204 generates a color distribution that stores colors of a color recommendation 126 associated with the color classification 124.

For example, the color classification 124 is associated with a color recommendation 126, which is a collection of predetermined colors that look aesthetically pleasing when worn by a person with the color classification 124. In some examples, color recommendation colors are different for different color classifications. In other examples, color recommendation colors overlap between different color classifications.

In this example, the color classification 124 is "Cool Summer," which means "cool, medium, and dark brown colors" look aesthetically pleasing when worn by the person. The color recommendation 126 includes 20 colors, including pinks, light blues, purples, greens, and dark brown. In other examples, the color recommendation 126 includes any number of colors. In some examples, the user selects a color to remove from the color recommendation 126. In other examples, the color recommendation 126 includes recommended colors for more than one person.

The color recommendation module 204 generates a color distribution that stores colors of the color recommendation 126. In this example, the color distribution is a 3D histogram 206, which is an approximate three-dimensional representation of numerical data from a digital image used to record a color distribution within the digital image. The 3D histogram 206 includes bins, and each bin contains pixels that fall within a range associated with the bin. For example, pixels are sorted by color and grouped into different bins for display in the 3D histogram 206. In this example, the 3D histogram is a low-resolution histogram, meaning similar colors are grouped together in a bin. The 3D histogram plots perceptual variations of hue, chroma, and lightness for color in a CIE Lab color space. RGB (red, green, and blue color channels) samples or sRGB samples from the color recommendation 126 are converted to Lab, increasing a count of corresponding bins in the histogram by adding a lightness component.

The color recommendation module 204 assigns color recommendation values to bins of the 3D histogram 206 based on a Euclidean distance from a bin to a nearest bin representing a color by generating a dense color recommendations histogram 702, which is a binary version of the 3D histogram 206. For example, the color recommendation module 204 assigns full bins (bins that represent a color) a value of 0 and assigns empty bins (bins that do not represent a color) a value of 1.

The color recommendation module 204 then computes a 3D Euclidean Distance Transform so that the bins store a value corresponding to a Euclidean Distance from a bin to a bin containing a color. To do this, the color recommendation module 204 inverts the bin values, so full bins have a value of 1 and empty bins have a value of 0. Therefore, bins with a value of 1 represent a perfect color match, and bins with a value of 0 represent an imperfect color match. Euclidean Distance values between the bins with values of 0 to a nearest bin of value 1 are normalized to represent a value from 0 to 1 and are assigned to respective bins, replacing the 0 values. Therefore, bins of the dense color recommendations histogram 702 that represent a color of the color recommendation 126 a value of 1, and bins on the dense color recommendations histogram 702 that are farthest from a color of the color recommendation 126 are assigned values approaching 0. In some examples, CIE LCh or OKLCh color spaces are used to plot the dense color recommendations histogram 702. In the dense color recommendations histogram 702, bins that are a closer match to a color of the color recommendation 126 are represented with brighter values (e.g., yellow) than with darker values (e.g., purple).

For example, Bin A 704 has a color recommendation value of 0.98 because it is a short Euclidean distance from a plotted color of the color recommendation module 204 on the 3D histogram 206, and Bin A 704 is displayed in a yellow color indicating a high color recommendation value. Conversely, Bin B 706 has a color recommendation value of 0.12 because it is a greater Euclidean distance from a plotted color of the color recommendation module 204 on the 3D histogram 206, and Bin B 706 is displayed in a purple color indicating a low color recommendation value. It is noted that while this example describes bins of the 3D histogram 206 and dense color recommendations histogram 702, bins are described as points in other examples.

In some examples, the color classification 124 is a blend of different color classifications. For example, a color classification 124 assigned to a person is a 75% Clear Spring and a 25% Warm Spring. The percentages indicate how strongly the color classification 124 correlates to a person based on the person's facial features. Accordingly, multiple 3D histograms are combined into a single histogram, the bins weighted accordingly based on the percentages associated with the color classification 124.

Figure 8:
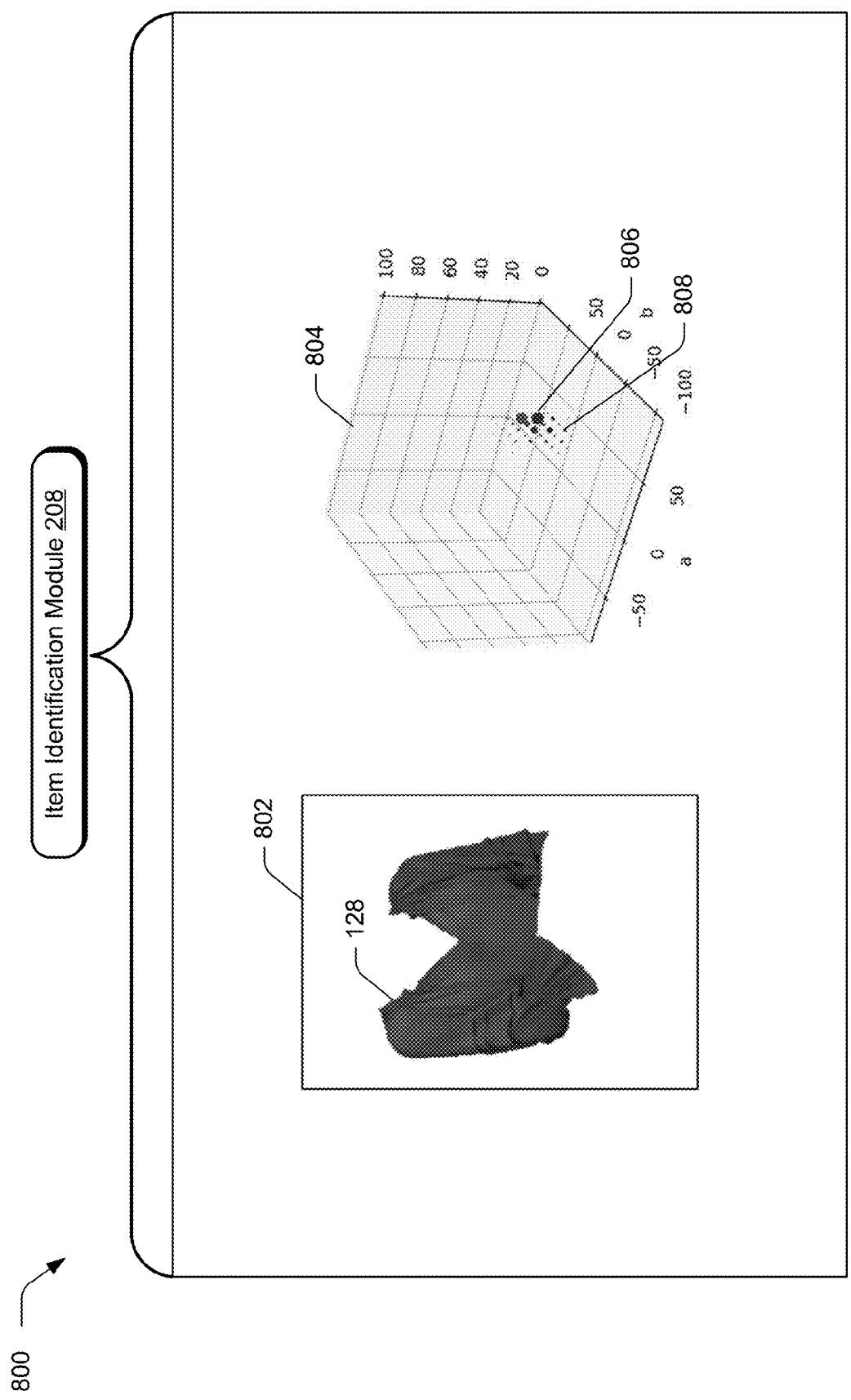
FIG. 8 depicts an example of extracting a color representation from an image of an item.

FIG. 8 depicts an example 800 of extracting a color representation from an image of an item. To begin this example, the item identification module 208 receives digital images depicting items 122. For example, the digital images depicting items 122 are uploaded by a retailer selling the items. In some examples, the digital images depicting items 122 depict items in the retailer's inventory, including items of clothing, accessories, or other products. In this example, one item is depicted in each of the digital images depicting items 122.

For example, the item identification module 208 receives an input including a digital image depicting an item 802. In this example, the item is a burgundy top. In some examples, the item identification module 208 isolates the portion of the digital image that depicts the item by removing an image background, other clothing, or a model wearing the item using cloth segmentation techniques. The item 128 is then isolated from the digital image depicting the item 802.

Next, the item identification module 208 determines the color representation of the item by determining what colors are featured on the item 128. To do this, the item identification module 208 extracts item colors from the item 128 and an item color distribution that plots the item colors. For example, item color distribution is an item color 3D histogram 804 that includes bins that correspond to bins of the 3D histogram 206. In other examples, the item identification module 208 plots the item colors on the 3D histogram 206.

In this example, the item 128 features multiple shades of burgundy because the item 128 features folds in fabric and shadows that create darker shades. To account for different shades of color, the item identification module 208 determines a "true" color of the item 128. To do this, bins of the item color 3D histogram 804 are assigned item color values ranging from 0 to 1 based on a prominence of a color on the item 128. For example, a very prevalent color on the item is assigned a value near 1, which is considered a "true" color of the item. The least prevalent colors of the image of the item are assigned values near 0. In some examples, color prevalence is measured by the total number of pixels of a color divided by total pixels. For example, Bin A 806 has an item color value of 0.99 because it is a prevalent color on the item 128. Conversely, Bin B 808 has an item color value of 0.11 because it is a less prevalent color on the item 128. In this example, Bin A 806 is displayed on the item color 3D histogram 804 as a larger bin than Bin B 808 because it contains a more prevalent color.

The item identification module 208 repeats these techniques for multiple items. For example, a different item color 3D histogram is generated for a different item and is associated with colors of the different item.

Figure 9:
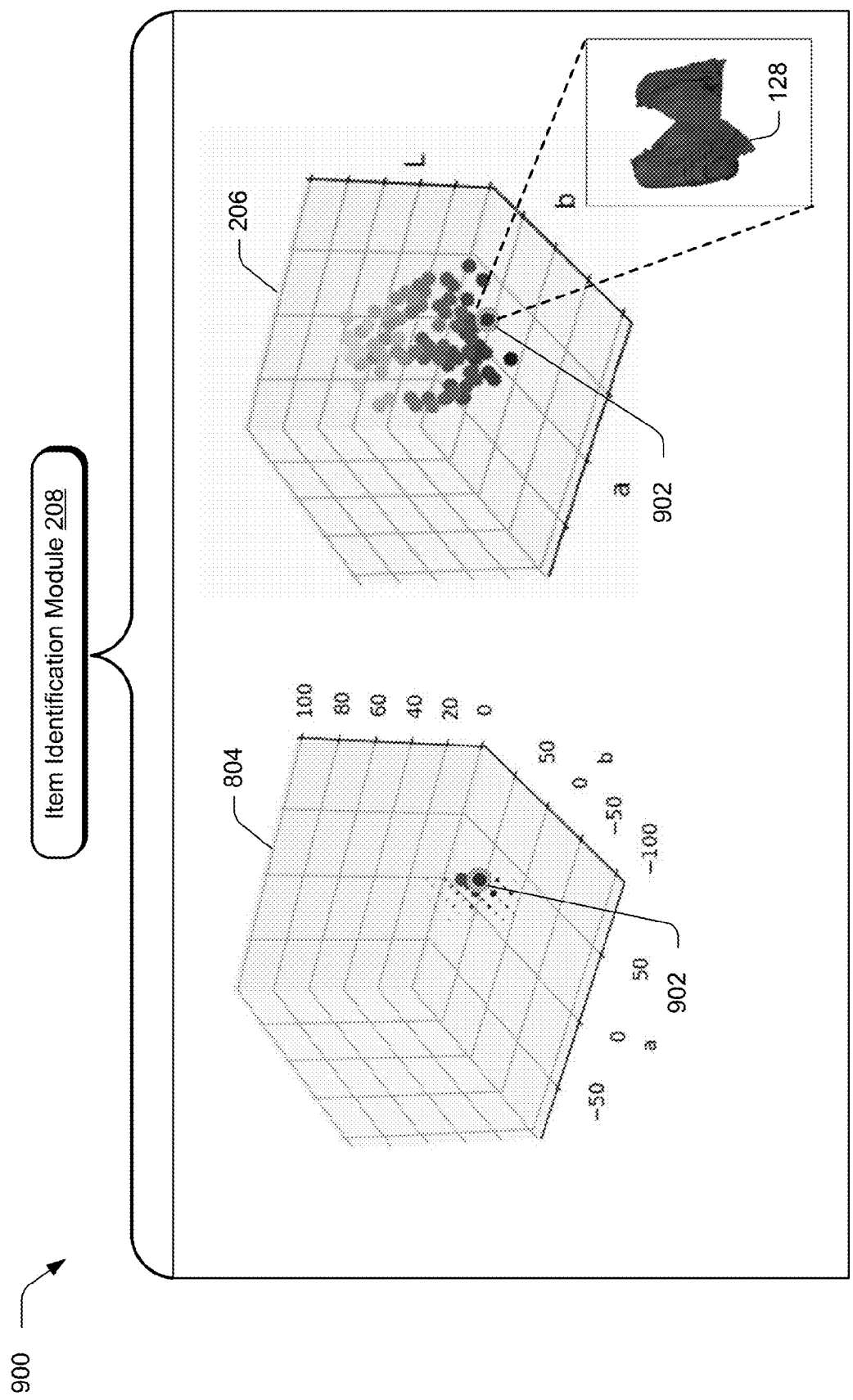
FIG. 9 depicts an example of identifying an item associated with a color of the color recommendation.

FIG. 9 depicts an example 900 of identifying an item associated with a color of the color recommendation. FIG. 9 is a continuation of the examples described in FIG. 7 and FIG. 8. After the color recommendation module 204 converts colors of the color recommendation 126 to a 3D histogram 206 and after the item identification module 208 converts colors of different items on multiple different item color 3D histograms, the item identification module 208 then identifies an item 128 associated with a color of the color recommendation 126.

To determine an item 128 from multiple items that features a color associated with a color of the color recommendation 126, the item identification module 208 multiplies each item color value by a color recommendation value assigned to a corresponding bin on the 3D histogram to produce a match value. The match value provides a measure of how "true" the color of the item is and how similar the color of the item is to a color of the color recommendation 126.

For example, Item Bin A 902 has a color recommendation value of 0.98 and an item color value of 0.99. When multiplied, this produces a match value of 0.9702, indicating a high similarity of a color of the color recommendation 126 to a prevalent color on the item 128. In this example, a predetermined criteria selects the item 128 for recommendation that has the highest match value. Therefore, after calculating match values for each item of the digital images depicting items 122, the item identification module 208 identifies the item 128 as the closest match.

In some examples, the item identification module 208 ranks match values in order of magnitude to determine an item 128 to recommend. In other examples, the color coordination module 116 selects an item 128 with a match value that is within a threshold range based on predetermined criteria.

In other examples, the retailer uses information provided by the item identification module 208 to determine how well the retailer is serving customers with a particular color classification. For example, the item identification module 208 determines that the retailer's inventory includes several items of clothing with colors that match color recommendations associated with a Warm Autumn color classification but few items of clothing with colors that match color recommendations associated with a Deep Winter color classification. Based on this, the retailer easily adjusts inventory levels accordingly.

Figure 10:
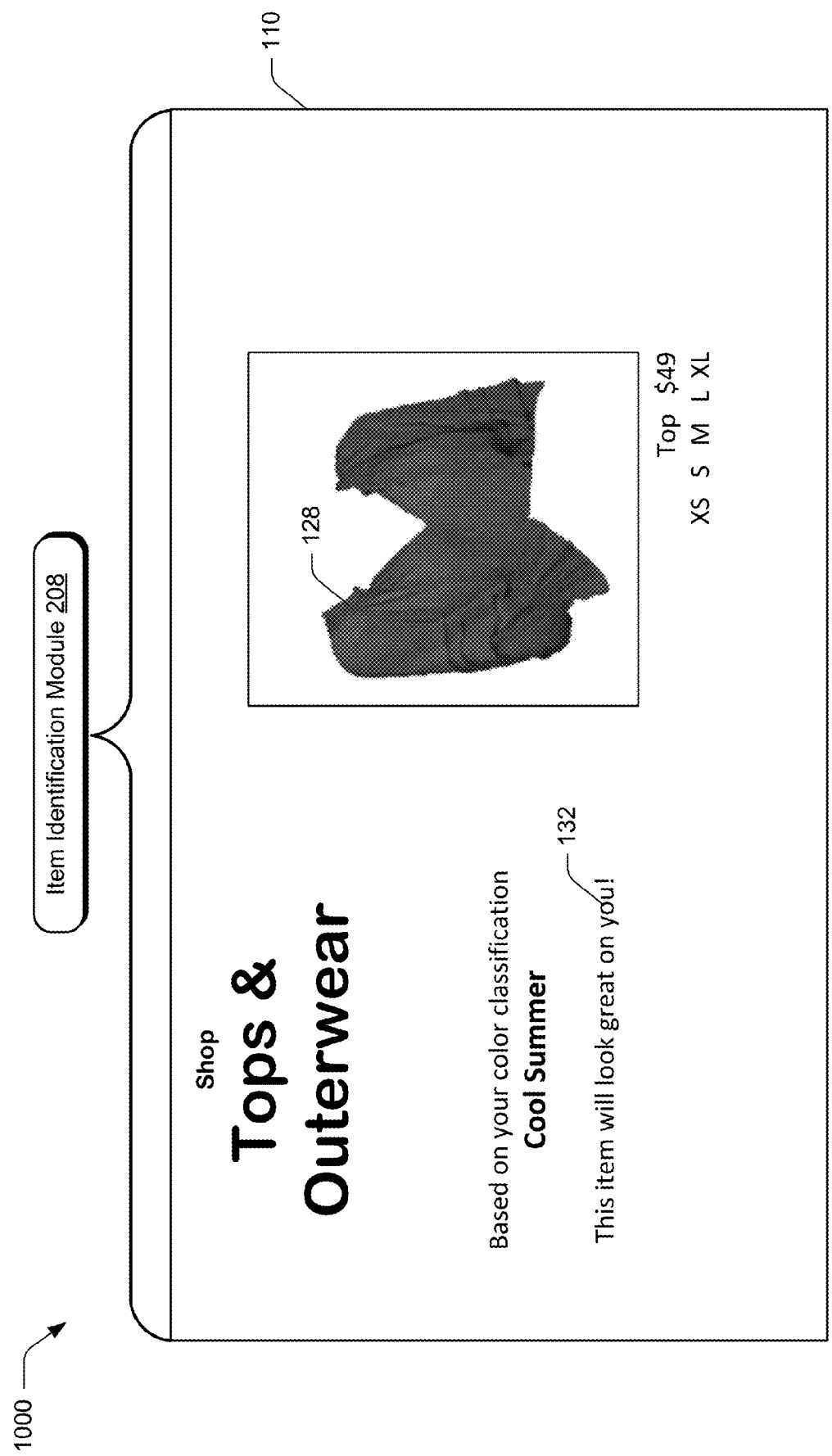
FIG. 10 depicts an example of displaying a recommendation that includes the item in a user interface.

FIG. 10 depicts an example 1000 of displaying a recommendation that includes the item 128 in a user interface 110. FIG. 10 is a continuation of the example described in FIG. 9. In some examples, after the item identification module 208 identifies an item 128 associated with a color of the color recommendation 126, the item identification module 208 generates an item recommendation 132 for display in the user interface 110.

In this example, the item identification module 208 identifies the item 128 to recommend to the person. Based on this, the item identification module 208 generates an item recommendation 132 for display in the user interface 110. For example, the item recommendation 132 is featured on a page of the online retail store. The item recommendation 132 says "Based on your color classification Cool Summer, this item will look great on you!" The item recommendation 132 also includes the digital image that features the item 128 and a link for the user to purchase the item. In other examples, the item recommendation 132 is displayed in the user interface 110 of a display device 112 located inside a physical retail store.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-10.

Figure 11:
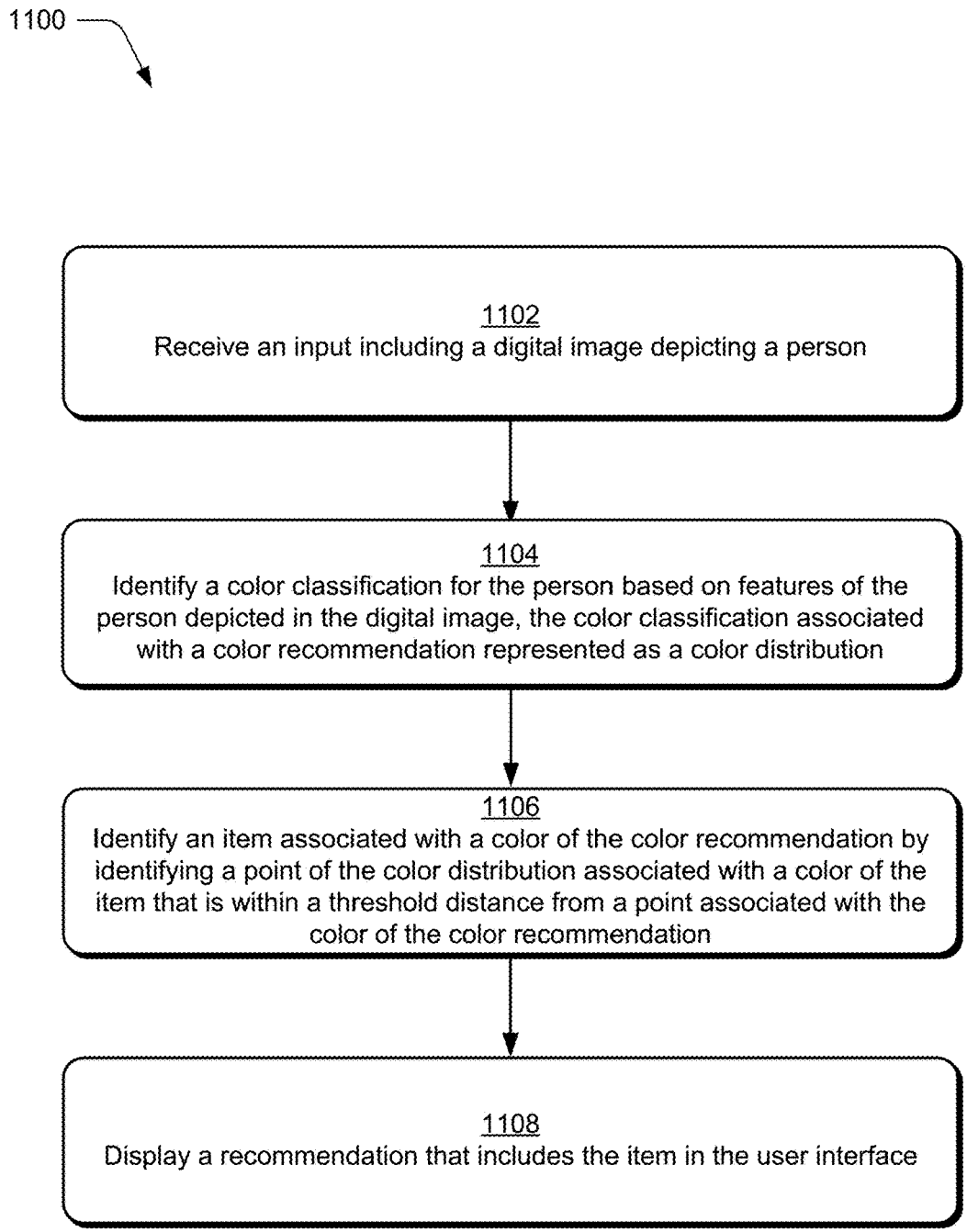
FIG. 11 depicts a procedure in an example implementation of automated colorimetry techniques supporting color classification.

FIG. 11 depicts a procedure 1100 in an example implementation of automated colorimetry techniques supporting color classification. At block 1102, an input 118 is received including a digital image depicting a person 120.

At block 1104, a color classification 124 is identified for the person based on features of the person depicted in the digital image, the color classification 124 associated with a color recommendation 126 represented as a color distribution. Some examples further include determining the features of the person by segmenting a portion of the digital image depicting facial skin, hair, or eyes from the digital image. Some examples further include calculating a skin undertone, a hair brightness, a color saturation, or a color contrast based on the portion of the digital image depicting the facial skin, the hair, or the eyes. Additionally or alternatively, white balancing is conducted on the digital image based on a white patch of the digital image depicting teeth or eyes. In some examples, the color distribution is a 3D histogram.

At block 1106, an item 128 associated with a color of the color recommendation 126 is identified by identifying a point of the color distribution associated with a color of the item 128 that is within a threshold distance from a point associated with the color of the color recommendation 126. Additionally or alternatively, identifying the item 128 further comprises multiplying a value assigned to the point of the color distribution associated with the color of the item 128 by a value assigned to the point associated with the color of the color recommendation 126. Some examples include receiving an image of the item and pre-processing the image of the item to extract a color representation of the item. Additionally or alternatively, an item color distribution is generated that plots the color representation of the item and assigns values to colors of the color representation of the item based on a prevalence of the colors in the image of the item. In some examples, the item 128 is listed for sale at an online retail store.

At block 1108, a recommendation that includes the item 128 is displayed in a user interface 110.

Figure 12:
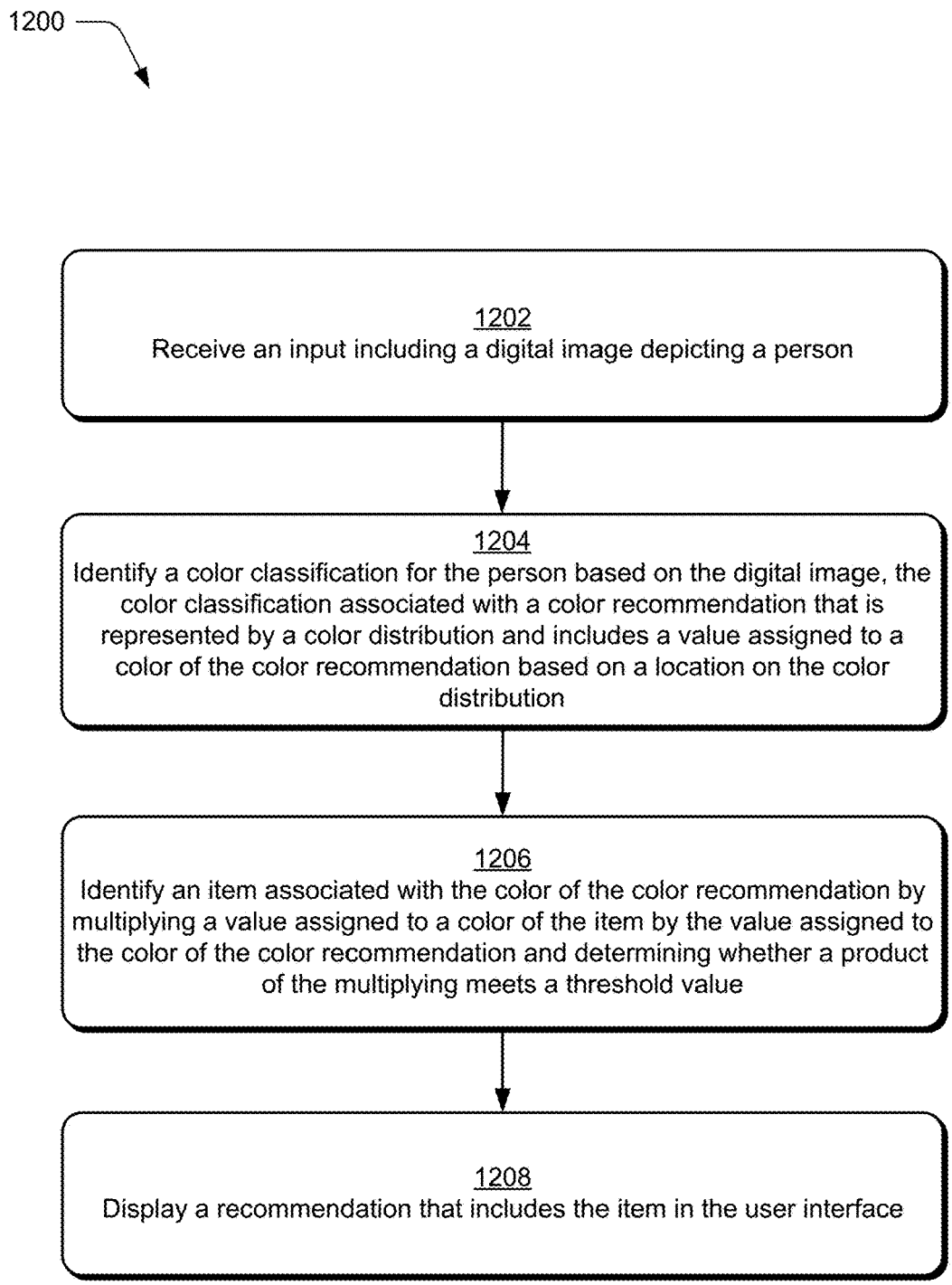
FIG. 12 depicts a procedure in an additional example implementation of automated colorimetry techniques supporting color classification.

FIG. 12 depicts a procedure 1200 in an additional example implementation of automated colorimetry techniques supporting color classification. At block 1202, an input 118 is received including a digital image depicting a person 120.

At block 1204, a color classification 124 for the person is identified based on the digital image, the color classification 124 associated with a color recommendation 126 that is represented by a color distribution and includes a value assigned to a color of the color recommendation 126 based on a location on the color distribution. In some examples, identifying the color classification 124 further comprises determining features of the person by segmenting a portion of the digital image depicting facial skin, hair, or eyes from the digital image. In some examples, a skin undertone, a hair brightness, a color saturation, or a color contrast are calculated based on the portion of the digital image depicting the facial skin, the hair, or the eyes. Additionally or alternatively, white balancing is conducted on the digital image based on a white patch of the digital image depicting teeth or eyes.

At block 1206, an item 128 associated with the color of the color recommendation 126 is identified by multiplying a value assigned to a color of the item by the value assigned to the color of the color recommendation 126 and determining whether a product of the multiplying meets a threshold value. In some examples, identifying the item further comprises receiving an image of the item 128 and pre-processing the image of the item 128 to extract a color representation of the item. Some examples further comprise generating an item color distribution that plots the color representation of the item and assigns values to colors of the color representation of the item based on a prevalence of the colors in the image of the item 128. In some examples, the item 128 is listed for sale at an online retail store.

At block 1208, a recommendation that includes the item 128 is displayed in a user interface 110.

Example System and Device

Figure 13:
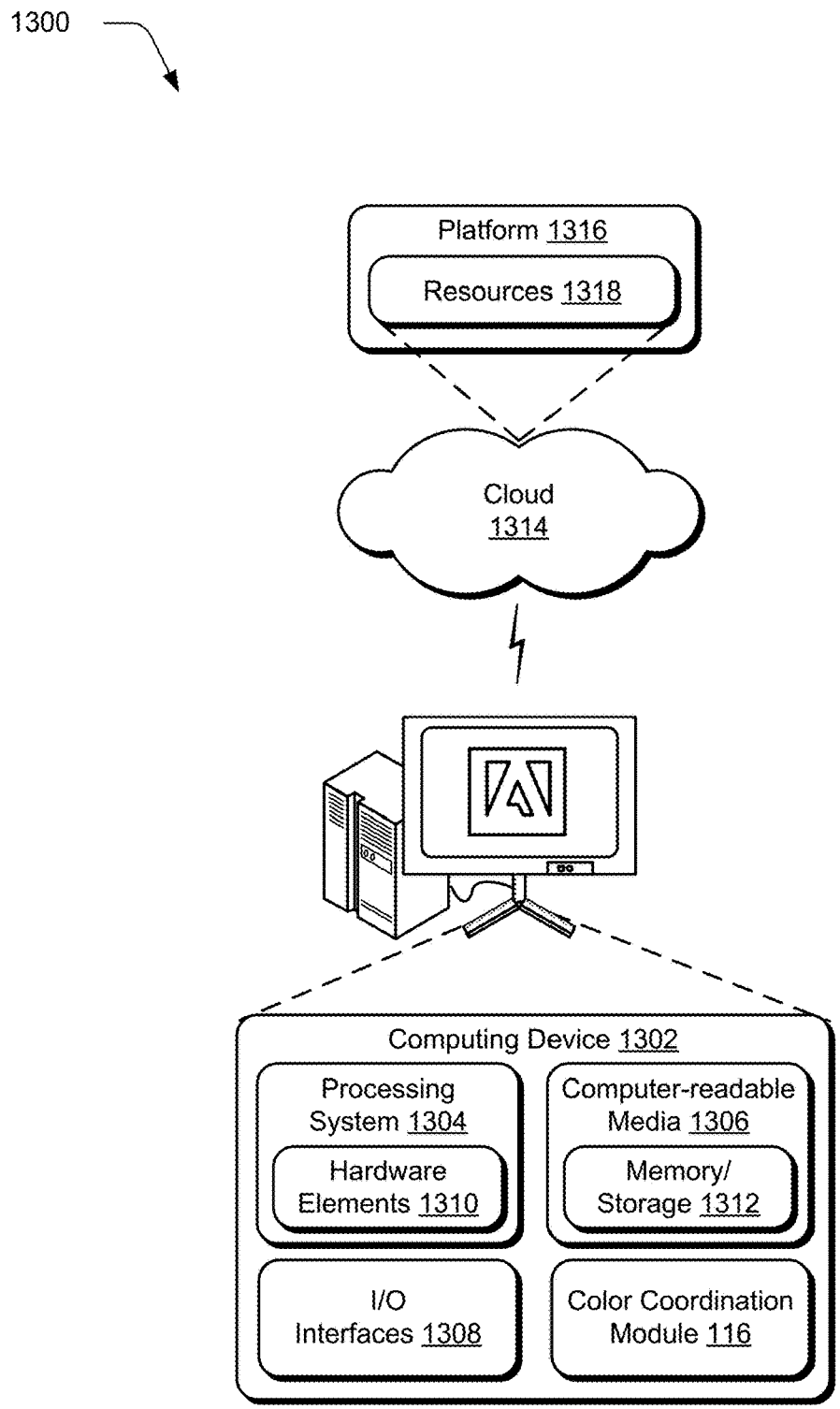
FIG. 13 illustrates an example system including various components of an example device that can be implemented as any type of computing device as described and/or utilized with reference to FIGS. 1-10 to implement embodiments of the techniques described herein.

FIG. 13 illustrates an example system generally at 1300 that includes an example computing device 1302 that is representative of one or more computing systems and/or devices that implement the various techniques described herein. This is illustrated through inclusion of the color coordination module 116. The computing device 1302 is configurable, for example, as a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that is configurable as processors, functional blocks, and so forth. This includes implementation in hardware as an application specific integrated circuit or other logic device formed using one or more semiconductors. The hardware elements 1310 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1306 is illustrated as including memory/storage 1312. The memory/storage 1312 represents memory/storage capacity associated with one or more computer-readable media. The memory/storage 1312 includes volatile media (such as random access memory (RAM)) and/or nonvolatile media (such as read only memory (ROM), Flash memory, optical disks, magnetic disks, and so forth). The memory/storage 1312 includes fixed media (e.g., RAM, ROM, a fixed hard drive, and so on) as well as removable media (e.g., Flash memory, a removable hard drive, an optical disc, and so forth). The computer-readable media 1306 is configurable in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1302. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1302, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1310. The computing device 1302 is configured to implement particular instructions and/or functions corresponding to the software and/or hardware modules. Accordingly, implementation of a module that is executable by the computing device 1302 as software is achieved at least partially in hardware, e.g., through use of computer-readable storage media and/or hardware elements 1310 of the processing system 1304. The instructions and/or functions are executable/operable by one or more articles of manufacture (for example, one or more computing devices and/or processing systems 1304) to implement techniques, modules, and examples described herein.

The techniques described herein are supported by various configurations of the computing device 1302 and are not limited to the specific examples of the techniques described herein. This functionality is also implementable through use of a distributed system, such as over a "cloud" 1114 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 include applications and/or data that can be utilized when computer processing is executed on servers that are remote from the computing device 1302. Resources 1318 can also include services provided over the Internet and/or through a subscriber network, such as a cellular or Wi-Fi network.

The platform 1316 abstracts resources and functions to connect the computing device 1302 with other computing devices. The platform 1316 also serves to abstract scaling of resources to provide a corresponding level of scale to encountered demand for the resources 1318 that are implemented via the platform 1316. Accordingly, in an interconnected device embodiment, implementation of functionality described herein is distributable throughout the system 1300. For example, the functionality is implementable in part on the computing device 1302 as well as via the platform 1316 that abstracts the functionality of the cloud 1314.

What is claimed is:

1. A method comprising:
    receiving, by a processing device, an input including a digital image depicting a person;
    identifying, by the processing device, a color classification based on a color of a feature of the person depicted in the digital image, the color classification associated with a color recommendation;
    identifying, by the processing device, an item associated with a color of the color recommendation by identifying a point of a color distribution associated with a color of the item that is within a threshold distance from a point associated with the color of the color recommendation, the color distribution plotting a prevalence of colors in the image of the item; and
    displaying, in a user interface by the processing device, a recommendation that includes the item.

2. The method of claim 1, wherein identifying the item further comprises multiplying a value assigned to the point of the color distribution associated with the color of the item by a value assigned to the point associated with the color of the color recommendation to determine whether a product of the multiplying meets a threshold value.

3. The method of claim 1, further comprising determining the features of the person by segmenting a portion of the digital image depicting facial skin, hair, or eyes from the digital image.

4. The method of claim 3, further comprising calculating a skin undertone, a hair brightness, a color saturation, or a color contrast based on the portion of the digital image depicting the facial skin, the hair, or the eyes.

5. The method of claim 3, further comprising conducting white balancing on the digital image based on a white patch of the digital image depicting teeth or eyes.

6. The method of claim 1, wherein the color distribution is represented as a 3D histogram.

7. The method of claim 1, wherein identifying the item further comprises receiving an image of the item and pre-processing the image of the item to extract a color representation of the item.

8. The method of claim 1, wherein the item is listed for sale at an online retail store.

9. A system comprising:
    a memory component; and
    a processing device coupled to the memory component, the processing device to perform operations comprising:
        receiving an input including a digital image depicting a person;
        identifying a color classification based on a color of a feature of the person depicted in the digital image the color classification associated with a color recommendation;
        identifying an item associated with the color of the color recommendation by multiplying a value assigned to a color of the color recommendation by the value assigned to a color of a color distribution plotting a prevalence of colors in the image of the item and determining whether a product of the multiplying meets a threshold value; and
        displaying, in a user interface, a recommendation that includes the item.

10. The system of claim 9, wherein identifying the color classification further comprises determining features of the person depicted in the digital image by segmenting a portion of the digital image depicting facial skin, hair, or eyes from the digital image.

11. The system of claim 10, further comprising calculating a skin undertone, a hair brightness, a color saturation, or a color contrast based on the portion of the digital image depicting the facial skin, the hair, or the eyes.

12. The system of claim 10, further comprising conducting white balancing on the digital image based on a white patch of the digital image depicting teeth or eyes.

13. The system of claim 9, wherein identifying the item further comprises receiving an image of the item and pre-processing the image of the item to extract a color representation of the item.

14. The system of claim 13, wherein the color distribution plots the color representation of the item and assigns values to colors of the color representation of the item based on a prevalence of the colors in the image of the item.

15. The system of claim 9, wherein the item is listed for sale at an online retail store.

16. A non-transitory computer-readable storage medium storing executable instructions, which when executed by a processing device, cause the processing device to perform operations comprising:
receiving an input including a digital image depicting a person;
identifying a color classification based on a color of a feature of the person depicted in the digital image, the color classification associated with a color recommendation;
identifying an item associated with a color of the color recommendation by identifying a point of a color distribution associated with a color of the item that is within a threshold distance from a point associated with the color of the color recommendation, the color distribution plotting a prevalence of colors in the image of the item; and
displaying, in a user interface, a recommendation that includes the item.

17. The non-transitory computer-readable storage medium of claim 16, further comprising determining the features of the person by segmenting a portion of the digital image depicting facial skin, hair, or eyes from the digital image and calculating a skin undertone, a hair brightness, a color saturation, or a color contrast based on the portion of the digital image depicting the facial skin, the hair, or the eyes.

18. The non-transitory computer-readable storage medium of claim 16, wherein identifying the item further comprises multiplying a value assigned to the point of the color distribution associated with the color of the item by a value assigned to the point associated with the color of the color recommendation to determine whether a product of the multiplying meets a threshold value.

19. The non-transitory computer-readable storage medium of claim 16, wherein identifying the item further comprises receiving an image of the item and pre-processing the image of the item to extract a color representation of the item and generating an item color distribution that plots the color representation of the item and assigns values to colors of the color representation of the item based on a prevalence of the colors in the image of the item.

20. The method of claim 1, further comprising generating the color distribution by assigning values to colors in the image of the item and ordering the colors based on the values.

* * * * *